(12) United States Patent
Yamazaki et al.

(10) Patent No.: US 7,894,166 B2
(45) Date of Patent: Feb. 22, 2011

(54) CPP GMR DEVICE WITH FERROMAGNETIC LAYER SPLIT IN DEPTH DIRECTION

(75) Inventors: Hiroshi Yamazaki, Tokyo (JP); Naoki Ohta, Tokyo (JP)

(73) Assignee: TDK Corporation, Tokyo (JP)

( * ) Notice: Subject to any disclaimer, the term of this patent is extended or adjusted under 35 U.S.C. 154(b) by 667 days.

(21) Appl. No.: 11/924,246

(22) Filed: Oct. 25, 2007

(65) Prior Publication Data

US 2009/0109577 A1    Apr. 30, 2009

(51) Int. Cl.
G11B 5/39    (2006.01)
(52) U.S. Cl. .................................. 360/324.11
(58) Field of Classification Search ............ 360/324.11, 360/324.2
See application file for complete search history.

(56) References Cited

U.S. PATENT DOCUMENTS 7,035,062 B1    4/2006    Mao et al.

7,177,122 B2    2/2007    Hou et al.

FOREIGN PATENT DOCUMENTS

| JP | 2004-335071 | 11/2004 |
| JP | 2005-44489 | 2/2005 |
| JP | 2007-80904 | 3/2007 |

*Primary Examiner*—Craig A. Renner
(74) *Attorney, Agent, or Firm*—Oblon, Spivak, McClelland, Maier & Neustadt, L.L.P.

(57) ABSTRACT

A magneto-resistive effect device of a CPP structure includes a nonmagnetic intermediate layer, and a first ferromagnetic layer and a second ferromagnetic layer stacked together and formed with the nonmagnetic intermediate layer sandwiched between them. The first ferromagnetic layer and the second ferromagnetic layer are magnetically coupled via the nonmagnetic intermediate layer such that magnetizations of the first ferromagnetic layer and the second ferromagnetic layer are antiparallel with each other. Mutually antiparallel magnetizations of two magnetic layers lie in a medium opposite plane or front to rear direction and in a rear to front direction. The second ferromagnetic layer is divided by a nonmagnetic intervening layer into a front second ferromagnetic layer and a rear second ferromagnetic layer on the way from the front to the rear.

9 Claims, 10 Drawing Sheets

CPP GMR DEVICE WITH FERROMAGNETIC LAYER SPLIT IN DEPTH DIRECTION

BACKGROUND OF THE INVENTION

1. Field of the Invention

The present invention relates to a magneto-resistive effect device adapted to read the magnetic field intensity of magnetic recording media or the like as signals, a thin-film magnetic head comprising that magneto-resistive effect device, and a head gimbal assembly and a magnetic disk system including that thin-film magnetic head.

2. Explanation of the Prior Art

In recent years, with an increase in the recording density of hard disks (HDDs), there have been growing demands for improvements in the performance of thin-film magnetic heads. For the thin-film magnetic head, a composite type thin-film magnetic head has been widely used, which has a structure wherein a reproducing head having a read-only magneto-resistive effect device (hereinafter often called the MR device for short) and a recording head having a write-only induction type magnetic device are stacked together.

The magneto-resistive effect device (CIP-GMR device) of the so-called CIP (current in plane) structure that operates on currents flowing parallel with the film plane of the device—called a spin valve GMR device—is now widely employed as the reproducing head. The spin valve GMR device of such structure is positioned between upper and lower shield layers each formed of a soft magnetic metal film, and sandwiched between insulating layers called gap layers. Recording density in the bit direction is determined by the gap (reproducing gap) between the upper and lower shield layers.

With an increase in the recording density, there has been a growing demand for narrower shield gaps and narrower tracks. As the reproducing head track grows narrow with a decreasing device height, so does the device area; however, with the prior art structure, there is an operating current limited from the standpoint of reliability, because there is heat dissipation efficiency decreasing with a decreasing area.

To solve such a problem, there is a GMR device of the CPP (current perpendicular to plane) structure (CPP-GMR device) proposed in the art, in which upper and lower shield layers and a magneto-resistive effect device are connected electrically in series to make do without any insulating layer between the shields. This technology is thought of as inevitable to achieve such recording densities as exceeding 200 Gbits/in$^2$.

Such a CPP-GMR device has a multilayer structure comprising a first ferromagnetic layer and a second ferromagnetic layer between which an electroconductive, nonmagnetic intermediate layer is sandwiched. A typical multilayer structure for the spin valve type CPP-GMR device comprises, in order from a substrate side, a lower electrode/antiferromagnetic layer/first ferromagnetic layer/electroconductive, nonmagnetic intermediate layer/second ferromagnetic layer/upper electrode stacked together in order.

The direction of magnetization of the first ferromagnetic layer that is one of the ferromagnetic layers remains fixed such that when the externally applied magnetic field is zero, it is perpendicular to the direction of magnetization of the second ferromagnetic layer. The fixation of the direction of magnetization of the first ferromagnetic layer is achieved by the exchange coupling of it with an antiferromagnetic layer provided adjacent to it, whereby unidirectional anisotropic energy (also called the "exchange bias" or "coupled magnetic field") is applied to the first ferromagnetic layer. For this reason, the first ferromagnetic layer is also called the fixed magnetization layer. By contrast, the second ferromagnetic layer is also called the free layer. Further, if the fixed magnetization layer (the first ferromagnetic layer) is configured as a triple-layer structure of a ferromagnetic layer/nonmagnetic metal layer/ferromagnetic layer (the so-called "multilayer ferri-structure" or "synthetic pinned layer"), it is then possible to effectively increase the exchange coupling force from the antiferromagnetic layer, and to reduce influences on the free layer of a static magnetic field resulting from the fixed magnetization layer. Thus, the "synthetic pinned structure" is now in extensive use.

However, a further slimming-down of the magneto-resistive effect device is in great need so as to meet a recent demand for ultra-high recording density. Such being the case, there is a novel GMR device structure put forward, which has a basic structure comprising a simple triple-layer arrangement of ferromagnetic layer/non-magnetic intermediate layer/ferromagnetic layer, as set forth in U.S. Pat. No. 7,177,1221B2 or U.S. Pat. No. 7,035,062B1. In such a new GMR device structure, the two ferromagnetic layers are exchange coupled together such that their magnetizations are antiparallel with each other. And, according the proposal of U.S. Pat. No. 7,177,122B2 or U.S. Pat. No. 7,035,062B1, under the action of a bias magnetic field given out of bias application means formed adjacent to two ferromagnetic layers, there is an initial state created in which the magnetizations of two magnetic layers are inclined about 45° with respect to the track width direction. Upon detection of a signal magnetic field from the medium in the initial state of the device, the directions of magnetization of the two magnetic layers change as if scissors cut paper, with the result that there is a change in the resistance value of the device. In the present disclosure, this new device structure may be called the "scissors type GMR device".

With the aforesaid proposal, however, there is a problem that unneeded information may be written on the medium (media), because the bias magnetic field comes perpendicularly out of the so-called ABS of the device that is in opposition to the medium toward the medium (media).

Further, the device structure according to the aforesaid proposal is more likely to be affected by the magnetic field from the medium (media), offering a problem that the operation of the device itself tends to get erratic.

The situations being like this, the present invention has been made for the purpose of providing a novel magneto-resistive effect device that does not only make use of a structure capable of narrowing the read gap (between the upper and the lower shield) to make improvements in linear recording densities thereby meeting recent demands for ultra-high density recording, but also gets around a problem of unneeded information being written on the medium (media) and makes the device less likely to be affected by the magnetic field, thereby enhancing the stability of operation of the device itself as well.

SUMMARY OF THE INVENTION

According to the present invention, the aforesaid object is accomplishable by the provision of a magneto-resistive effect device of the CPP structure comprising a nonmagnetic intermediate layer, and a first ferromagnetic layer and a second ferromagnetic layer stacked together and formed with the nonmagnetic intermediate layer sandwiched between them, wherein the first ferromagnetic layer and the second ferromagnetic layer are magnetically coupled via the nonmagnetic intermediate layer such that the magnetizations of the first ferromagnetic layer and the second ferromagnetic layer are antiparallel with each other wherein the mutually antiparallel magnetizations of two magnetic layers lie in a medium opposite plane or front to rear direction and in a rear to front direction, the second ferromagnetic layer is divided by a nonmagnetic intervening layer into a front second ferromagnetic layer and a rear second ferromagnetic layer on the way from the front to the rear, and the front second ferromagnetic layer and a front portion of the first ferromagnetic layer located at a position that makes a pair with the front second ferromagnetic layer via the nonmagnetic intermediate layer defines a substantial magnetic sensor portion with a sense current applied to it in a stacking direction.

In a preferable embodiment of the magneto-resistive effect device of the invention, said front second ferromagnetic layer at said magnetic sensor portion is more likely to be affected by an external magnetic field and larger in the degree of movement of magnetization direction than the front portion of said first ferromagnetic layer.

In a preferable embodiment of the magneto-resistive effect device of the invention, to and at a rear position of either one of said first ferromagnetic layer and said second ferromagnetic layer there is an antiferromagnetic layer connected and formed to bring about magnetic coupling between said first ferromagnetic layer and said second ferromagnetic layer.

In a preferable embodiment of the magneto-resistive effect device of the invention, at each end of said magnetic sensor portion in a widthwise direction, there is a bias magnetic field-applying layer located.

In a preferable embodiment of the magneto-resistive effect device of the invention, said nonmagnetic intermediate layer has varying thicknesses at a front surface portion and a rear portion.

In a preferable embodiment of the magneto-resistive effect device of the invention, the front surface portion of said nonmagnetic intermediate layer is made of a material of weaker coupling and the rear portion of said nonmagnetic intermediate layer is made of a material of stronger coupling.

The invention provides a thin-film magnetic head, comprising a plane in opposition to a recording medium, and the aforesaid magneto-resistive effect that is located near said medium opposite plane to detect a signal magnetic field from said recording medium.

Further, the invention provides a head gimbal assembly, comprising a slider including the aforesaid thin-film magnetic head and located in opposition to the recording medium, and a suspension adapted to resiliently support said slider.

Furthermore, the invention provides a hard disk system, comprising a slider including the aforesaid thin-film magnetic head and located in such a way as to oppose to a recording medium, and a positioning device adapted to support and position said slider with respect to said recording medium.

DETAILED EXPLANATION OF THE PREFERRED EMBODIMENTS

Figure 1:
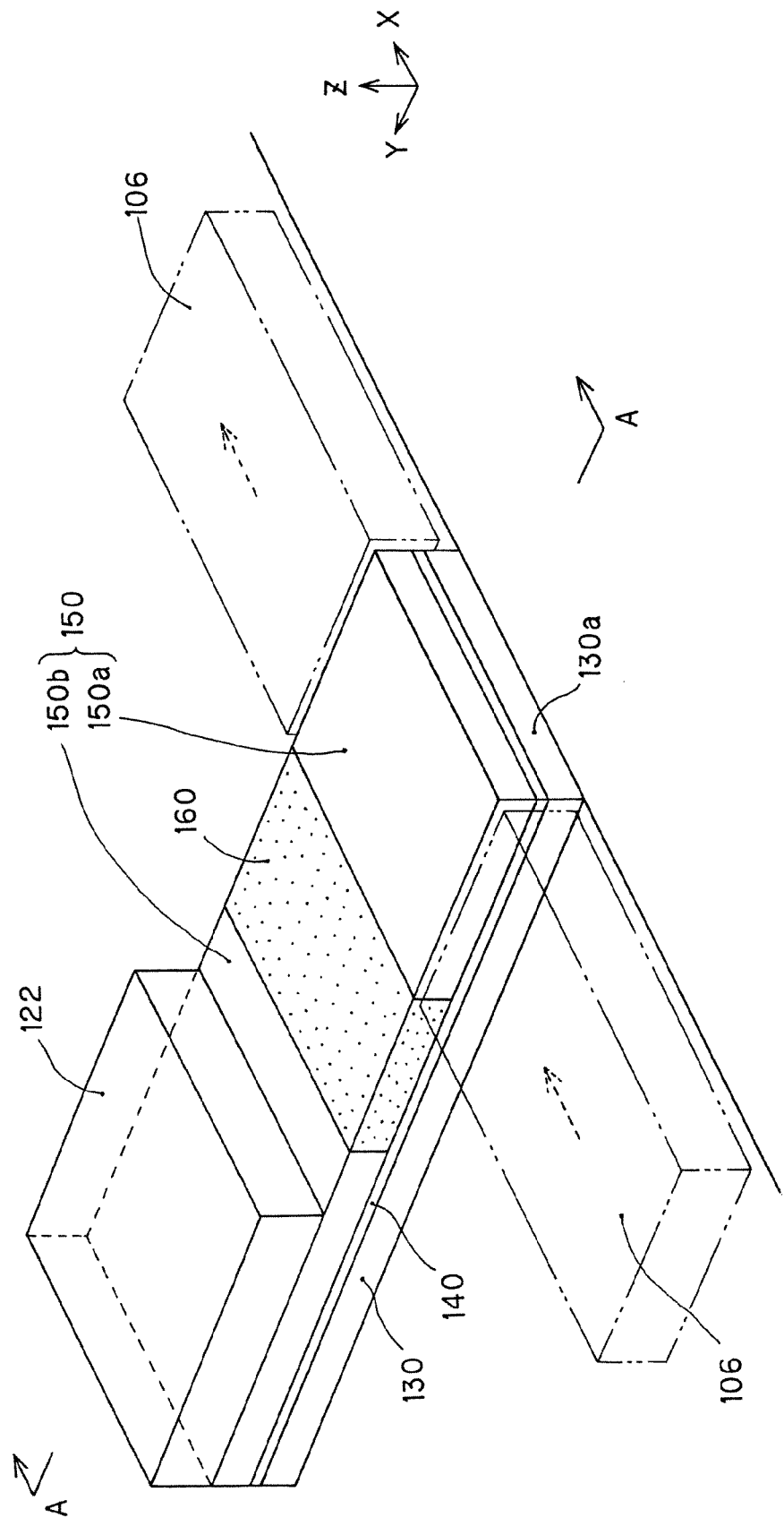
FIG. 1 is illustrative in perspective of the arrangement of part of the magneto-resistive effect device according to an embodiment of the invention.

The best mode for carrying out the invention is now explained in greater details.

The magneto-resistive effect device of the invention is preferably used with a thin-film magnetic head in general, and its reproducing head in particular.

In the following disclosure of the invention, the sizes of each device component in the X-, Y- and Z-axis directions shown in the drawings will be referred to as the "width", "length" and "thickness", respectively. The side of the device nearer to the air bearing surface (the plane of the thin-film magnetic head in opposition to the recording medium) in the Y-axis direction will be called "forward" and the opposite side (depth-wise side) will be called "rearward", and the direction of stacking the individual films up will be called "upward" or "upper side" and the opposite direction will be called "downward" or "lower side".

Figure 2:
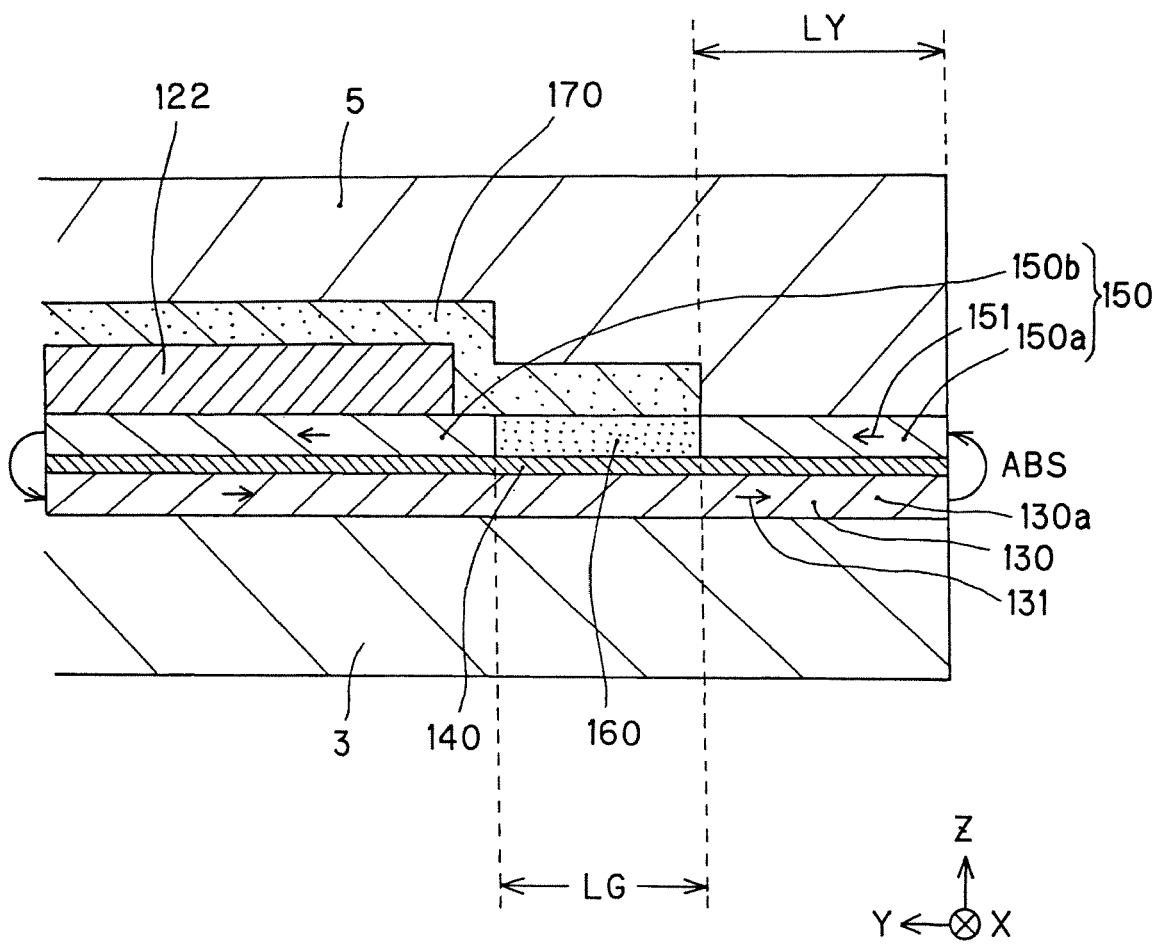
FIG. 2 is a view as taken on arrowed section A-A of FIG. 1, with members not shown in FIG. 1 being added, too.

FIG. 1 is illustrative in perspective of the arrangement of part of the magneto-resistive effect device according to an embodiment of the invention, and FIG. 2 is a view as taken along the arrowed A-A section of FIG. 1, to which members not shown in FIG. 1 are added, too.

Figure 3:
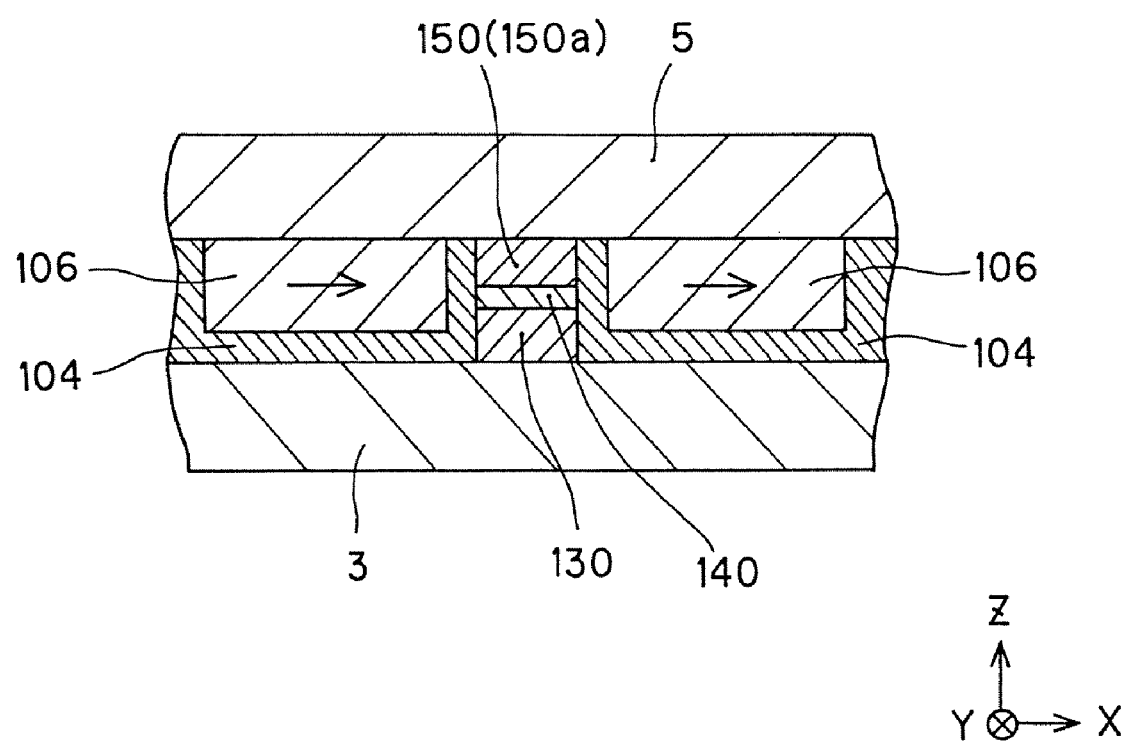
FIG. 3 is a view of the ABS (air bearing surface) of the magneto-resistive effect device according to the invention.

FIG. 3 is illustrative of the ABS (air bearing surface) of the magneto-resistive effect device according to the invention: it is illustrative in schematic of the ABS of the magneto-resistive effect device (CPP-MR device) having the CPP structure—part of the invention in particular. The ABS is generally corresponding to a plane (hereinafter often called the medium opposite plane) at which a reproducing head is in opposition to a recording medium; however, it is understood that the ABS here includes even a section at a position where the multilayer structure of the device can be clearly observed. For instance, a protective layer of DLC (the protective layer adapted to cover the device) or the like, in a strict sense, positioned facing the medium opposite plane may be factored out, if necessary.

Figure 4:
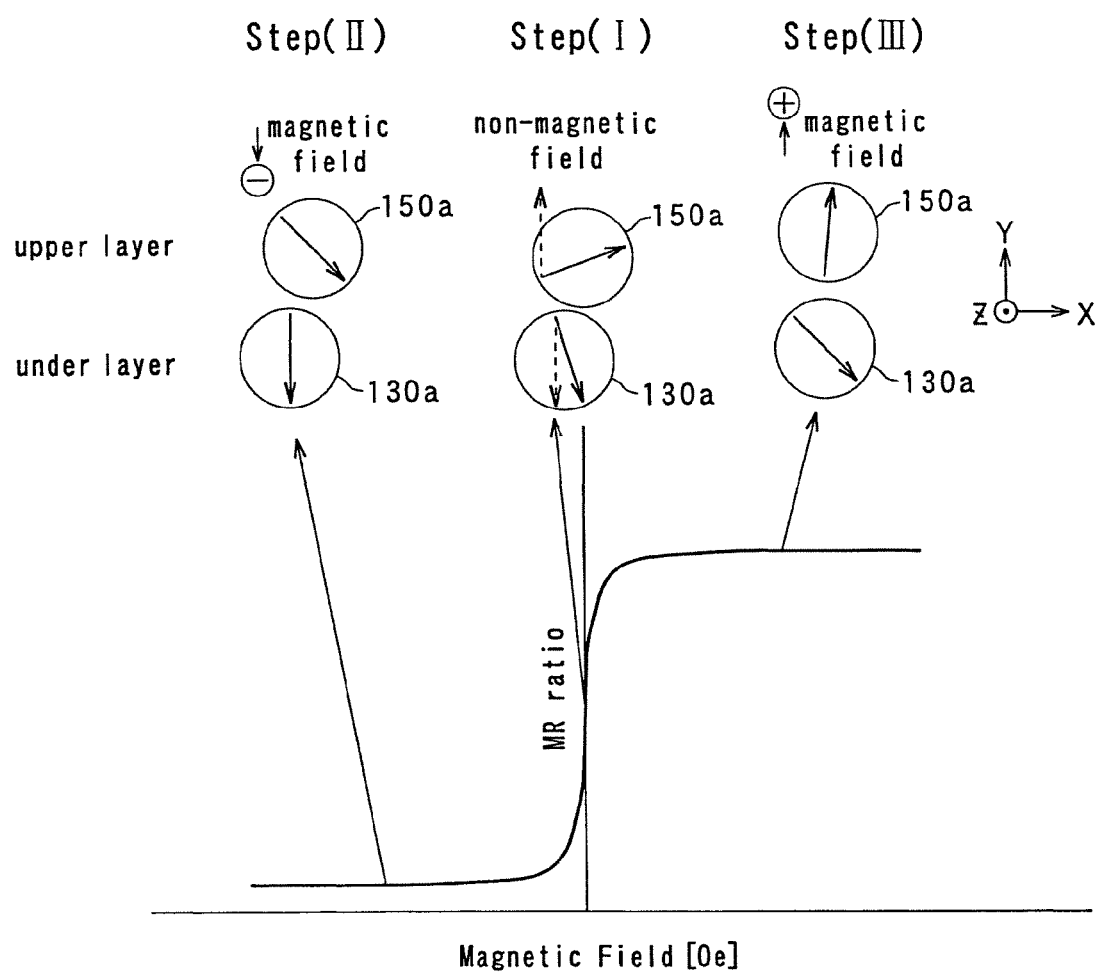
FIG. 4 is illustrative of the principles of operation of the magneto-resistive effect device according to the invention: it is a model view with a magneto-resistive change curve drawn on it, showing how the direction of magnetization of two magnetic layers forming a sensor portion changes in conformity to that curve.

FIG. 4 is illustrative of the principles of operation of the magneto-resistive effect device according to the invention: it is a model view with a magneto-resistive change curve drawn on it, showing how the direction of magnetization of two magnetic layers forming a sensor portion changes in conformity to that curve.

[Explanation of the Structure of the Magneto-Resistive Effect Device]

As shown in FIGS. 1 and 2, the magneto-resistive effect device of the invention comprises a nonmagnetic intermediate layer 140, and a first ferromagnetic layer 130 and a second ferromagnetic layer 150 stacked and formed with that nonmagnetic intermediate layer 140 sandwiched between them.

As shown in FIG. 2, the first 130 and the second ferromagnetic layer 150 are magnetically coupled together via the nonmagnetic intermediate layer 140 such that the magnetizations 131 and 151 of the first 130 and the second ferromagnetic layer 150 are mutually antiparallel with each other. With none of the influences of an external magnetic field, the mutually antiparallel magnetizations of two such ferromagnetic layers 130 and 150 lie in a medium opposite plane or front to rear direction (indicated at 151), and in a rear to front direction (indicated at 131).

In the embodiment here, as shown in FIGS. 1 and 2, at a rear position of the second ferromagnetic layer 150, there is an antiferromagnetic layer 122 stacked and formed to bring about the magnetic coupling of the first 130 and the second ferromagnetic layer 150. In the embodiment here, the antiferromagnetic layer 122 is exchange coupled with the second ferromagnetic layer 150 such that the magnetization of the second ferromagnetic layer 150 lies in the medium opposite plane or front to rear magnetization direction (indicated at 151).

As shown in FIGS. 1 and 2, part of the invention is that the second ferromagnetic layer 150 is divided by a nonmagnetic intervening layer 160 into a front second ferromagnetic layer 150a and a rear second ferromagnetic layer 150b on the way from the front to the rear, and that both layers 150a and 150b each stay magnetically coupled with the first ferromagnetic layer 130 via the nonmagnetic intermediate layer 140.

An in the invention, it is a substantial sensor portion that is defined by the front second ferromagnetic layer 150a and a front portion 130a of the first ferromagnetic layer 130 at such a position as to make a pair with the front second ferromagnetic layer 150a via the nonmagnetic intermediate layer 140. In short, the front second ferromagnetic layer 150a and the front portion 130a of the first ferromagnetic layer 130 work such that the angle made between the directions of magnetizations at both layers changes relatively depending on an external magnetic field.

As shown in FIG. 2, below the first ferromagnetic layer 130 there is a lower read shield layer 3 formed that functions as a combined electrode and magnetic shield, and above the second ferromagnetic layer 150 (including the non-magnetic intervening layer 160) there is an upper read shield layer 5 formed via a part of a nonmagnetic insulating layer 170, which functions as a combined electrode and magnetic shield.

It is noted that although not shown in FIG. 2, between the first ferromagnetic layer 130 and the lower read shield layer 3, and between the front second ferromagnetic layer 150a of the second ferromagnetic layer 150 and the upper read shield layer 5, there is a nonmagnetic electroconductive film interposed that is made of Ta, Ru, Ti or the like. That nonmagnetic electroconductive film should have a thickness of about 5 nm.

A sense current for measuring a magneto-resistive change is applied to between the lower read shield layer 3 and the upper read shield layer 5. In other words, the magneto-resistive effect device of the invention is a magneto-resistive effect device of the CPP (current perpendicular to plane) structure with the sense current applied in the stacking direction of the device film of the magnetic sensor portion.

In the embodiment shown in FIG. 2, the front end face of the nonmagnetic insulating layer 170 is in alignment with the front end face of the nonmagnetic intervening layer 160, in which case a distance LY from the ABS that is the medium opposite plane to the front end face of the nonmagnetic insulating layer 170 in the depth (rearward) area functions as a substantial magnetic sensor portion.

In the invention, the front second magnetic layer 150a at the magnetic sensor portion is more sensitive to an external magnetic field and larger in the degree of movement of the magnetization direction with respect to the external magnetic field than the front portion 130a of the first ferromagnetic layer 130 at the magnetic sensor portion. To put it another way, when the front second ferromagnetic layer 150a at the magnetic sensor portion is compared with the front portion 130a in terms of the free layer function, the front second ferromagnetic layer 150a functions more as the free layer and is more sensitive to the external magnetic field.

Such a difference in the free layer function between both layers is due to a unique construction wherein the second ferromagnetic layer 150 is divided by the nonmagnetic intervening layer 160 into the front second ferromagnetic layer 150a and the rear second ferromagnetic layer 150b on the way from the front (ABS) to the rear.

A Y-direction intervening distance LG of the nonmagnetic intervening layer 160 shown in FIG. 2 is set such that the magnetic coupling of the second ferromagnetic layer 150 with the first ferromagnetic layer 130 is kept intact, and there is a difference in the free layer function between both layers, say, the front second ferromagnetic layer 150a and the front portion 130a functioning as a sensor, making sure the detection of the external magnetic field.

Specific parameters of which care is taken when designing the intervening distance LG of the nonmagnetic intervening layer 160, for instance, include the magnetic coupling strength of the front second ferromagnetic layer 150a with the rear second ferromagnetic layer 150b, the magnitude of the magnetic moment of the first ferromagnetic layer 130 or the like.

Further as shown in FIGS. 1 and 3, at each end across the width of the magnetic sensor portion there is a bias magnetic field-applying layer 106 located via an insulating layer 104 (see FIG. 3).

In the embodiment here, the direction of a magnetic field applied by the bias magnetic field-applying layer 106 lies in the widthwise (X) direction from the left toward the right (on the drawing sheet), as indicated by an arrow in FIG. 1 or 3. The strength of the magnetic field applied by the bias magnetic field-applying layer 106 should preferably be set such that with none of the signal magnetic field to be detected, the magnetization direction of the front second ferromagnetic layer 150a makes an angle near about 90° (for instance, about 90°±20°) with the magnetization direction of the front portion 130a of the first ferromagnetic layer 130. That is, this state is the so-called initial state before the signal magnetic field is detected. The operation of the magneto-resistive effect device of detecting signal magnetic fields will be described later.

[Explanation of the Material for Each of the Components that Form the Magneto-Resistive Effect Device]

The material for each of the components that form the aforesaid magneto-resistive effect device is now explained.

First 130 and Second Ferromagnetic Layer 150:

There is the mention of NiFe, CoFe, CoFeB, CoFeNi, $Co_2MnSi$, $Co_2MnGe$, $FeO_x$ (the oxide of Fe), $CoO_x$ (the oxide of Co, etc.

Each layer should have a thickness of about 0.5 to 8 nm.

These layers function as the so-called free layers that vary in the direction of magnetization under the influences of an externally applied magnetic field.

Nonmagnetic Intervening Layer 160:

There is the mention of $Al_2O_3$, $SiO_2$, $SiO_xN_y$, MgO, $HfO_2$, $TiO_2$, DLC (diamond carbon), etc.

Nonmagnetic Intermediate Layer 140:

There is the mention of Ru, Ir, Rh, Cr, Cu, Zn, Ga, ZnO, InO, SnO, GaN, ITO (indium tin oxide), etc.

The layer should have a thickness of about 0.5 to 5 nm.

Upper 5 and Lower Shield Layer 3:

There is the mention of NiFe, CoZrTa, Sendust, NiFeCo, CoZrNb, etc.

Each layer should have a thickness of about 20 nm to 3 μm.

Antiferromagnetic Layer 122:

The antiferromagnetic layer 122 works such that by way of exchange coupling with the second ferromagnetic layer 150, the magnetization direction of the second ferromagnetic layer 150 stays fixed.

For instance, the antiferromagnetic layer 122 is made of an antiferromagnetic material containing at least one element M' selected from the group of Pt, Ru, Rh, Pd, Ni, Cu, Ir, Cr and Fe, and Mn. The content of Mn is preferably 35 to 95 at %. The antiferromagnetic material is broken down into two types: (1) a non-heat treatment type antiferromagnetic material that shows anti-ferromagnetism even in the absence of heat treatment to induce an exchange coupling magnetic field between it and a ferromagnetic material, and (2) a heat treatment type antiferromagnetic material that comes to show anti-ferromagnetism by heat treatment. In the invention, both types (1) and (2) may be used without restriction. For instance, the non-heat treatment type antiferromagnetic material is exemplified by RuRhMn, FeMn, and IrMn, and the heat treatment type antiferromagnetic material is exemplified by PtMn, NiMn, and PtRhMn.

The antiferromagnetic layer 122 should have a thickness of about 3 to 100 nm.

Nonmagnetic Insulating Layer 170:

There is the mention of $Al_2O_3$, $SiO_2$, $SiO_xN_y$, MgO, $HfO_2$, $TiO_2$, DLC (diamond carbon), etc.

Insulating Layer 104:

There is the mention of $Al_2O_3$, $SiO_2$, $SiO_xN_y$, MgO, $HfO_2$, $TiO_2$, DLC (diamond carbon), etc.

Bias Magnetic Field-Applying Layer 106:

For the bias magnetic field-applying layer 106, for instance, use is made of a hard magnetic layer (hard magnet) or a ferromagnetic/antiferromagnetic multilayer structure. To be more specific, there is the mention of CoPt, and CoCrPt.

[Explanation of the Operation of the Magneto-Resistive Effect Device of Detecting the Signal Magnetic Field]

The operation of the magneto-resistive effect device of detecting a signal magnetic field according to the invention is now explained with reference to FIG. 4. FIG. 4 is illustrative of the principles of operation of the magneto-resistive effect device according to the invention: it is a model view with a magneto-resistive change curve drawn on it, showing how the direction of magnetization of two magnetic layers forming a sensor portion changes in conformity to that curve. On the lower half of FIG. 4, there is a magneto-resistive change curve drawn with an external magnetic field as abscissa and a resistance change rate as ordinate.

In Step (I) shown in FIG. 4 with no magnetic field applied as yet, the magnetization direction of the front second ferromagnetic layer 150a and the magnetization direction of the front portion 130a of the first ferromagnetic layer 130 are drawn. Magnetic field strength is set such that with none of the signal magnetic field to be detected, the magnetization direction of the front second ferromagnetic layer 150a makes an angle near about 90° (for instance, about 90°±20°) with the magnetization direction of the front portion 130a of the first ferromagnetic layer 130. It is this state that is corresponding to the so-called initial state before the signal magnetic field is detected.

In the embodiment as described above, the magnetization direction of the front second ferromagnetic layer 150a and the magnetization direction of the front portion 130a of the first ferromagnetic layer 130 in Step (I) are affected by a bias magnetic field from the bias magnetic field-applying layer 105: they are rotated and energized from an arrowed state with no bias, drawn by a dotted line, in the X-direction, assuming on an arrowed state indicated by a solid line. As already noted, the front second ferromagnetic layer 150a has its magnetization more likely to move, because it acts more as the free layer and is more sensitive to the magnetic field than the front portion 130a.

As a signal magnetic field (external magnetic field) of a plus (+) sign indicative of an ingoing direction to the magnetic sensor portion as shown in Step (III) is applied from the initial state shown in Step (I), the angle between the magnetization direction of the front second ferromagnetic layer 150a and the front portion 130a of the first ferromagnetic layer 130 grows large (ideally, getting close to the antiparallelism of 180°). There is thus an increase in the resistance change rate (MR ratio).

On the other hand, as a signal magnetic field (external magnetic field) of a minus (−) sign indicative of an outgoing direction from the magnetic sensor portion as shown in Step (II) is applied from the initial state shown at Step (I), the angle between the magnetization direction of the front second ferromagnetic layer 150a and the front portion 130a of the first ferromagnetic layer 130 grows small (ideally, getting close to the parallelism of 0°). There is thus a decrease in the resistance change rate (MR ratio).

[Explanation of Modifications to the Structure of the Magneto-Resistive Effect Device]

The structure of the magneto-resistive effect device as described above with reference to FIGS. 1, 2 and 3 may be modified as follows.

Modification (1)

The structure of the magneto-resistive effect device as described above with reference to FIGS. 1, 2 and 3 may make do without the bias magnetic field-applying layer 106.

In this case, there is none of the bias magnetic field-applying layer 106; there must be a separate means located to turn to the widthwise (X) direction the magnetization direction of the magnetic layers of the first 130 and the second ferromagnetic layer 150 positioned at the sensor portion.

To turn the magnetization direction to the widthwise (X) direction, the magnetostriction of the magnetic layers positioned at the sensor portion is made negative. When the magnetostriction of the magnetic layers is negative, the easy axis of magnetization tends to turn to the vertical direction to stress. Accordingly, when magnetic layers are processed, stress on processing is applied to them in the height (Y) direction; this could be used to turn the magnetization direction of the magnetic layers positioned at the sensor portion to the widthwise (X) direction.

Modification (2)

The structure of the magneto-resistive effect device as described above with reference to FIGS. 1, 2 and 3 may make do without the antiferromagnetic layer 122.

In this case, there is none of the antiferromagnetic layer 122; for the device to act the same way as is the case with the antiferromagnetic layer 122, the components must be limited as follows.

In this case, if the first 130, and the second ferromagnetic layer 150 is configured as being rectangular in the (Y) direction from the ABS to the rear to give them shape anisotropy, then it is possible to create the same state as could be in the presence of the anti-ferromagnetic layer 122. The rectangular shape here refers to one having an aspect ratio of greater than 1.4 that is the ratio of the depthwise (Y-direction) length to the widthwise (X-direction) length. In practical applications, that shape may just as well be designed with capacitances with shields, etc. in mind.

Modification (3)

In the magneto-resistive effect device as described above with reference to FIGS. 1, 2 and 3, the nonmagnetic intermediate layer 140 may be set such that (1) there is a thickness profile provided from the ABS in the rearward (Y) direction, and (2) the front surface portion (on the ABS side) and the rear portion of the nonmagnetic intermediate layer 140 are made of varying materials.

That is, (1) if the nonmagnetic intermediate layer 140 is made of an identical material, but at the same time its front surface portion (on the ABS side) is made thicker while its rear portion is made thinner, then there is weaker coupling at that front surface portion, and stronger coupling at that rear portion. It is thus possible to make the function of the sensor portion easily controllable and boost up theoretical output. Thickness may then as well be optionally regulated in the range of, for instance, 0.5 to 5.0 nm.

(2) If the nonmagnetic intermediate layer 140 is of uniform thickness, but at the same time its front surface portion 140a (on the ABS side) is made of a material of weaker coupling (e.g., $Al_2O_3$, MgO, and $TiO_2$) and its rear portion 140b is made of a material of stronger coupling (e.g., Ru, and Cu), then there is weaker coupling at that front surface portion, and stronger coupling at that rear portion. It is thus possible to make the function of the sensor portion easily controllable and boost up theoretical output.

It goes without saying that an arrangement of (1) combined with (2), i.e., wherein a thickness profile is given before and after the nonmagnetic intermediate layer 140 while there are different materials used before and after it, too, is a preferable embodiment. For details of that arrangement, see specific experiments given later.

[Explanation of the Whole Structure of the Thin-Film Magnetic Head]

One preferable construction of the whole structure of the thin-film magnetic head according to the invention is now explained with reference to FIGS. 5A, 5B, 6 and 7.

Figure 5:
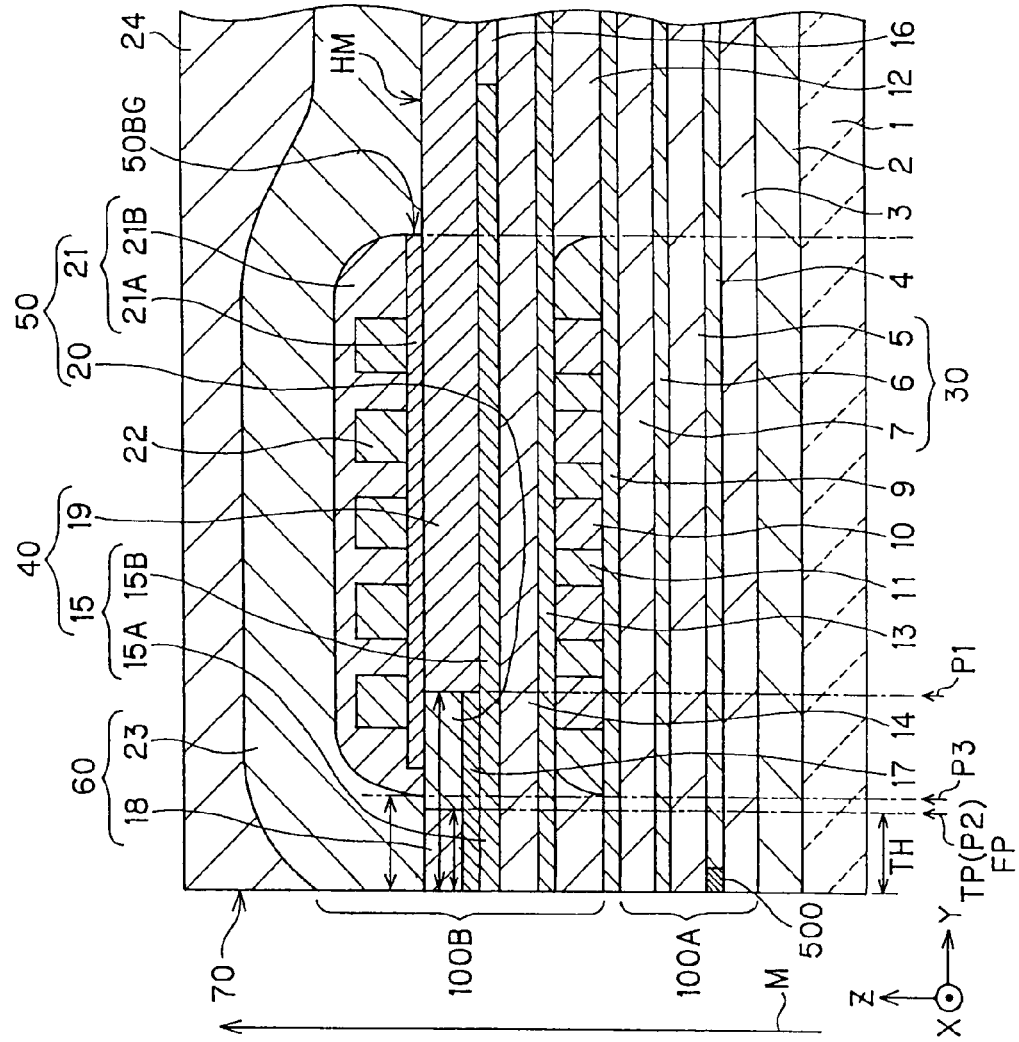
FIG. 5A is illustrative in section of the thin-film magnetic head parallel with the so-called air bearing surface (ABS)
FIG. 5B is illustrative in section of the thin-film magnetic head orthogonal to the air bearing surface.
Figure 6:
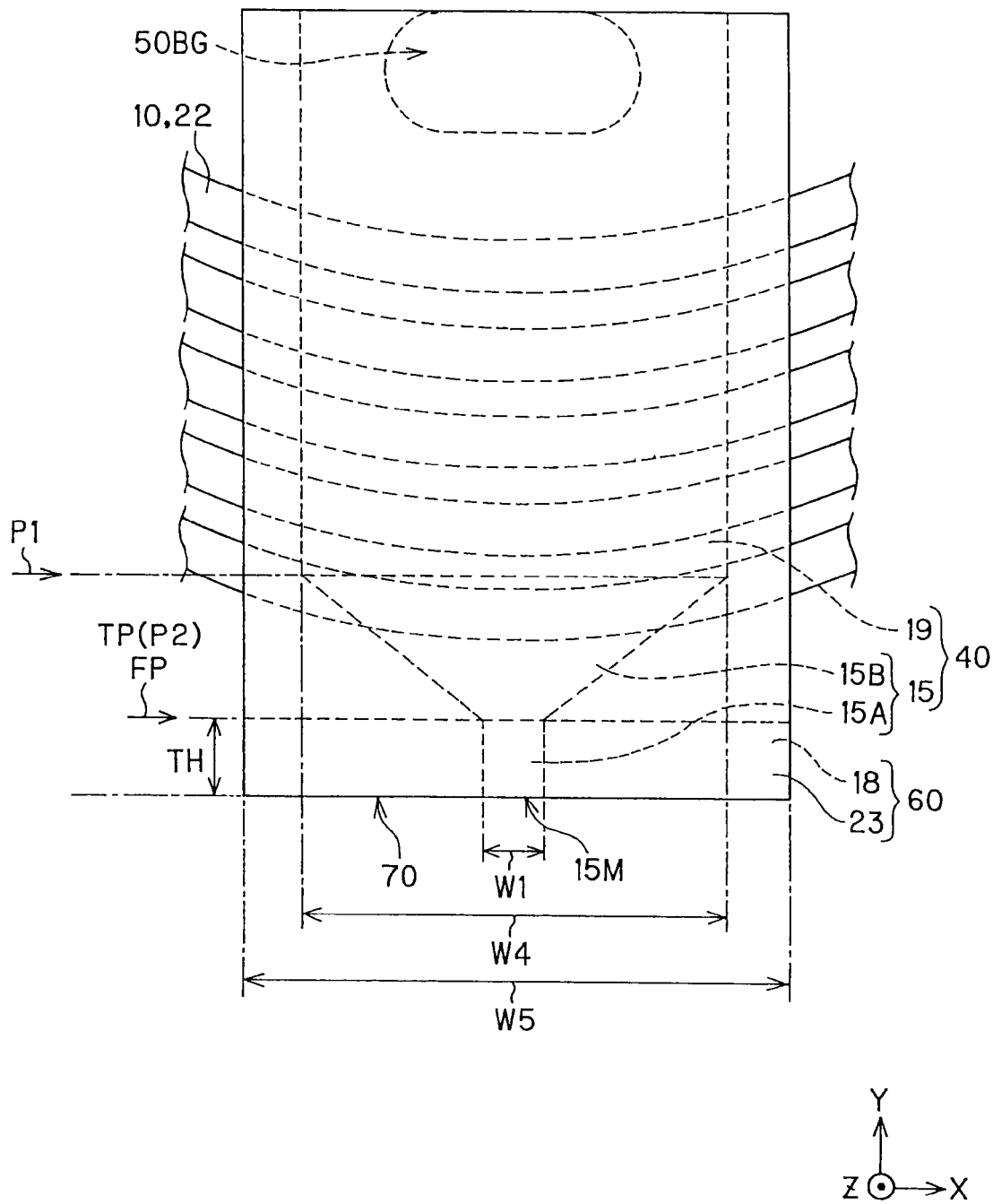
FIG. 6 is an enlarged perspective view of a portion near the magnetic pole layer of the write head.
Figure 7:
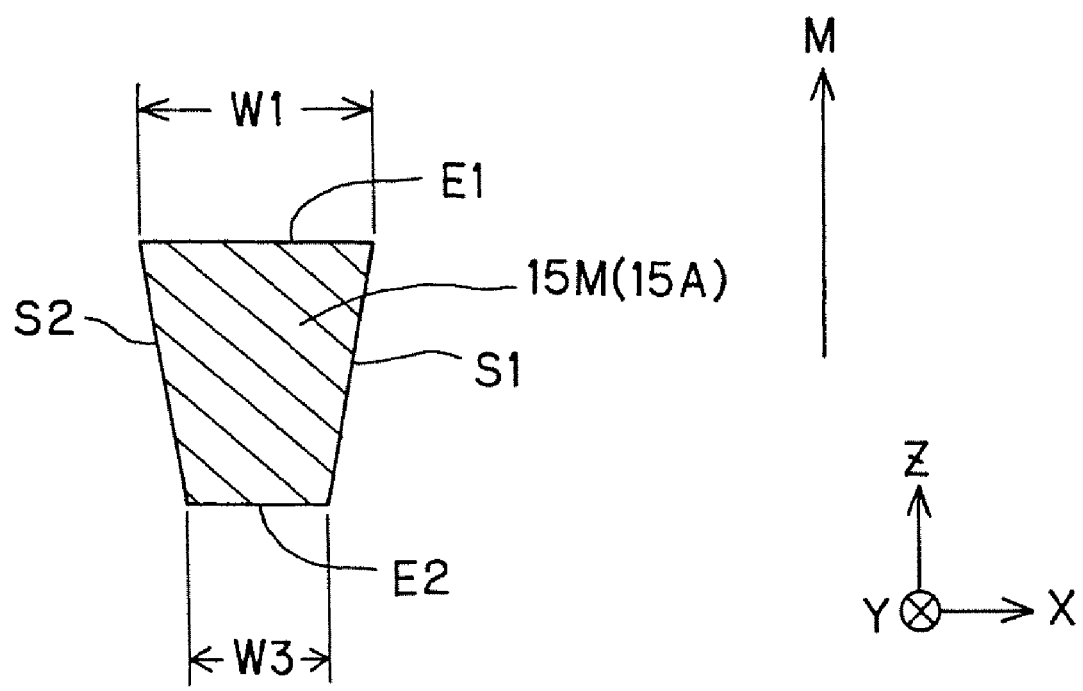
FIG. 7 is illustrative of the morphology of an end portion of the main magnetic pole at the air bearing surface.

FIG. 5A is illustrative in section of the thin-film magnetic head parallel with the so-called air bearing surface (ABS), and FIG. 5B is illustrative in section of the thin-film magnetic head orthogonal to the air bearing surface. The air bearing surface (ABS) here is equivalent to the plane (also called the medium opposite plane) at which the thin-film magnetic head is in opposition to a magnetic recording medium. FIG. 6 is an enlarged plan view of the thin-film magnetic head near a magnet pole layer adapted to implement perpendicular magnetic recording, and FIG. 7 is illustrative of the morphology of an end portion of a main magnetic pole at the air bearing surface.

The thin-film magnetic head shown in FIGS. 5A and 5B is used on a magnetic recording system such as a hard disk drive for the purpose of applying magnetic processing to a recording medium like a hard disk drive moving in the medium travel direction M.

For instance, the thin-film magnetic head illustrated in the drawings is a composite type head capable of implementing both recording and reproducing as magnetic processing. The structure comprises, as shown in FIG. 5, a substrate 1 made of a ceramic material, and an insulating layer 2 made of a non-magnetic insulating material, a reproducing head portion 100A adapted to reproduce magnetic information recorded by harnessing the magneto-resistive (MR) effect, a separation layer 9 made of a nonmagnetic insulating material, a shield type recording head portion 100B adapted to implement a perpendicular recording mode of recording processing, and an overcoat layer 24 made of a nonmagnetic insulating material, all stacked one upon another on the substrate 1 in that order.

In the embodiment illustrated, the reproducing head portion 100A has a multilayer structure comprising a lower read shield layer 3, a magneto-resistive effect device 500, and a shield layer 5 (in this embodiment, a part of an upper read shield layer 30) stacked one upon another in that order. At the rear end face of the magneto-resistive effect device 500 there is a shield gap layer 4 (refill layer 4) formed.

In the embodiment shown in FIGS. 5A and 5B, both the lower 3 and the upper read shield layer 30 have a function of separating the magneto-resistive effect device magnetically from the surroundings.

In the embodiment here, the upper read shield layer 30 is divided into two shield layers 5 and 7 via a nonmagnetic layer 6 in the thickness direction.

The upper first read shield layer 5 is made of a magnetic material such as permalloy. The upper second read shield layer 7 is likewise made of a magnetic material such as permalloy, too. The nonmagnetic layer 6 is made of a non-magnetic material such as ruthenium (Ru) or alumina.

It is noted that the upper read shield layer 30 is not always required to have a multilayer structure; it could have a single-layer structure as is the case with the lower read shield layer 3.

The shield gap film 4 is made of a nonmagnetic material such as alumina.

The recording head portion 100B, for instance, has a multilayer structure comprising a first-stage thin-film coil 10 buried around with insulating layers 11, 12, 13, a nonmagnetic layer 14, a main magnetic pole layer 40 partially buried around with an insulating layer 16, a gap layer 17, a second-stage thin-film coil 22 buried with an insulating layer 50 that forms a magnetic coupling opening (back gap 50BG) and a write shield layer 60, all stacked one upon another in order.

The thin-film coil 10 has a primary function of generating a leakage-preventive magnetic flux for holding back leakage of a recording magnetic flux produced at the thin-film coil 22.

The thin-film coil 10 typically operates such that currents flow in a direction opposite to the direction taken by currents flowing through the thin-film coil 22.

The insulating layers 11, 12, 13 are formed in such a way as to separate the thin-film coil 10 electrically from the surroundings. The insulating layer 11 is formed in such a way as to be filled up between the turns of the thin-film coil 10 and provide a cover around the thin-film coil 10. This insulating layer 11 is made of a non-magnetic insulating material such as a photoresist.

The insulating layer 12 is formed in such a way as to provide a cover around the insulating layer 11. This insulating layer 12 is made of a nonmagnetic material such as alumina.

The insulating layer 13 is formed in such a way as to give a cover to the thin-film coil 10 as well as the insulating layers 11, 12. This insulating layer 13 is made of a nonmagnetic material such as alumina.

The nonmagnetic layer 14 is formed of a nonmagnetic insulating material such as alumina, or a nonmagnetic electroconductive material such as ruthenium.

The main magnetic pole layer 40 has a primary function of implementing recording processing by receiving a magnetic recording magnetic flux produced at the thin-film coil 22 and releasing that magnetic flux toward the recording medium for implementing recording processing. More specifically, the main magnetic pole layer 40 is to generate a magnetic field (perpendicular magnetic field) to magnetize the recording medium in a direction orthogonal to its surface on the basis of a recording magnetic flux, thereby implementing recording processing in the perpendicular recording mode.

Such main magnetic pole layer 40 is located on the leading side of the thin-film coil, extending rearward from the air bearing surface 70, more specifically, as far as the back gap 50BG.

In the embodiment here, the main magnetic pole layer 40 has a structure where, as shown in FIG. 5, a main magnetic pole 15 and a magnetic pole main layer 19 are stacked one upon another in order and thereby coupled to each other.

The main magnetic pole 15 functions as a portion for releasing off a main writing magnetic flux. This main magnetic pole 15 extends rearward from the air bearing surface 70 on the leading side, more specifically, as far as the back gap 50BG.

As shown in FIG. 6, for instance, the main magnetic pole 15 is configured in a generally battledore type planar shape. To be more specific, the main magnetic pole 15 comprises, in order from the air bearing surface 70, a front end 15A that extends rearward from that air bearing surface 70 and has a constant width W1 for defining the recording track width of the recording medium and a rear end 15B that is linked to the rear of that front end 15A and has a width W4 greater than the width W1 (W4>W1). The position at which the width of the main magnetic pole 15 starts growing wide from the front end 15A (of width W1) toward the rear end 15B (of width W4) is a "flare point FP".

The front end 15A is primarily adapted to substantially release a recording magnetic flux produced at the thin-film coil 22 toward the recording medium, and has an exposed surface 15M exposed on the air bearing surface 70, as shown in FIG. 6.

As shown typically in FIG. 7, the exposed surface 15M takes a planar shape defined by an upper end edge (one end edge) E1 positioned on the trailing side, a lower end edge (another end edge) E2 positioned on the leading side, and two side end edges S1 and S2. To be more specific, the exposed surface 15M typically assumes on a trapezoidal shape with its width becoming gradually narrow from the trailing side toward the leading side (W1>W3). The trailing edge of the front end 15A provides a substantial recording site of the magnetic pole layer 40.

The rear end 15B shown in FIG. 6 is adapted to receive the magnetic flux received in the magnetic pole main layer 19 and feed it to the front end 15A. Typically, the width of this rear end 15B remains constant (width W4) in the rear, and becomes gradually narrow from width W4 to width W1 in the front as the front end 15A comes near.

The magnetic pole main layer 19 functions as a portion adapted to receive a dominant magnetic flux. Typically, this magnetic pole main layer 19 extends rearward from a position P1 (the first position) receded from the air bearing surface 70.

As shown typically in FIG. 6, the magnetic pole main layer 19 has a rectangular planar shape of width W4.

The insulating layer 16 is provided to isolate the main magnetic pole 15 electrically from the surroundings. This insulating layer 16 is made of a nonmagnetic insulating material such as alumina.

The gap layer 17 is formed in such a way as to provide a gap for the magnetic separation of the magnetic layer 40 from the write shield layer 60.

The insulating layer 50 defines the throat height TH that is one of important determinants for the recording performance of the thin-film magnetic head, and is adapted to cover the thin-film coil 22 in such a way as to isolate it electrically from the surroundings.

As shown in FIG. 5, the insulating layer 50 has a multilayer structure in which an auxiliary insulating layer 20 (the first insulating layer portion) formed in such a way as to define the throat height TH substantially and a main insulating layer 21 (the second insulating layer portion) formed in such a way as to substantially cover the thin-film coil 22 are stacked one upon another in that order.

As shown in FIG. 5, the auxiliary insulating layer 20 extends along the gap layer 17 and from a position receded from the air bearing surface 70, viz., a position P2 (the second position) between the air bearing surface 70 and a position P1 to the position P1 in the rear. And, the auxiliary insulating layer 20 is provided in such a way as to be adjacent to the magnetic pole main layer 19 at the position P1, and adjacent to the write shield layer 60 (the TH defining layer 18 to be described later) at the position P2. In the embodiment here in particular, the auxiliary insulating layer 20 defines a flat plane HM together with the magnetic pole main layer 19 and TH defining layer 18.

The aforesaid "position P2" is corresponding to the foremost end position of the insulating layer 50 (nearest to the air bearing surface 70). That is, there is a "zero throat height position TP" for defining the throat height TH. That throat height TH is a distance between the air bearing surface 70 and the zero throat height position TP. This auxiliary insulating layer 20 is made of a non-magnetic insulating material such as alumina. In the embodiment shown in FIGS. 5 and 6, the zero throat height position TP is in coincidence with the flare point FP.

As shown in FIG. 5, the main insulating layer 21 extends rearward from a position P3 (the third position) between the positions P1 and P2 while lying along the flat plane HM of the auxiliary insulating layer 20. More specifically, the main insulating layer 21 extends in such a way as not to fill up the back gap 50BG, and is receded from the auxiliary insulating layer 20. As shown typically in FIG. 5, this main insulating layer 21 comprises a main insulating layer portion 21A that is located as an underlay of the thin-film coil 22 on the flat plane HM of the auxiliary insulating layer 20, and a main insulating layer portion 21B that is located in such a way as to cover the thin-film coil 22 and the main insulating layer portion 21A around it.

The main insulating layer portion 21A is made of a non-magnetic material such as alumina.

The main insulating layer portion 21B is made of a non-magnetic insulating material such as a photoresist or spin-on-glass (SOG).

The thin-film coil 22 is formed for the generation of a recording magnetic flux. For instance, the thin-film coil 22 operates such that currents flow in the direction opposite to the direction taken by currents through the aforesaid thin-film coil 10.

The write shield layer 60 works capturing the spreading component of a recording magnetic flux released off the magnetic pole layer 40, thereby holding back the spreading of that magnetic flux.

The write shield layer 60 here comprises the TH defining layer 18 (the first magnetic shield layer portion) and a yoke layer 23 (the second magnetic shield layer portion) that are separate from each other, and has a structure wherein the TH defining layer 18 and yoke layer 23 are coupled to each other.

The TH defining layer 18 functions as a dominant magnetic flux inlet port adapted to capture an extra portion of the magnetic flux released directly from the magnetic pole.

The TH defining layer 18 is made of a magnetic material having a high saturation flux density such as permalloy or iron alloys, and assumes on a rectangular planar shape having a width W5 larger than the width W4 of the main magnetic pole layer 40 (W5>W4), as shown in FIG. 6.

The yoke layer 23 is set up in such a way as to function as a passage for the magnetic flux captured out of the TH defining layer 18, and function as a return yoke for allowing the magnetic flux to go back from the lining layer of the medium.

In the embodiment here, for instance, the yoke layer 23 extends as far as the rear of the back gap 50BG while linked to the main magnetic pole layer 40 at the back gap 50BG.

For such a thin-film magnetic head as described above, it is desired that constant dimensions defined on the basis of a specific component element be optimized to make sure recording performance, as typically shown in FIG. 5.

It is here noted that the whole structure of the thin-film magnetic head as described above is never limited to that described above, and so may be modified in various ways.

[Explanation of the Head Gimbal Assembly and the Hard Disk System]

One example of the head gimbal assembly or the hard disk system, with the foregoing thin-film head mounted on it, is now explained.

A slider 210 included in the head gimbal assembly is first explained with reference to FIG. 8. In the hard disk system, the slider 210 is located in such a way as to face a hard disk that is a rotationally driven disk-form recording medium. This slider 210 primarily comprises a substrate 211 built up of a substrate and overcoat.

The substrate 211 is in a generally hexahedral shape. Of the six surfaces of the substrate 211, one surface is in opposition to the hard disk. On that one surface there is the air bearing surface 70 formed.

Figure 8:
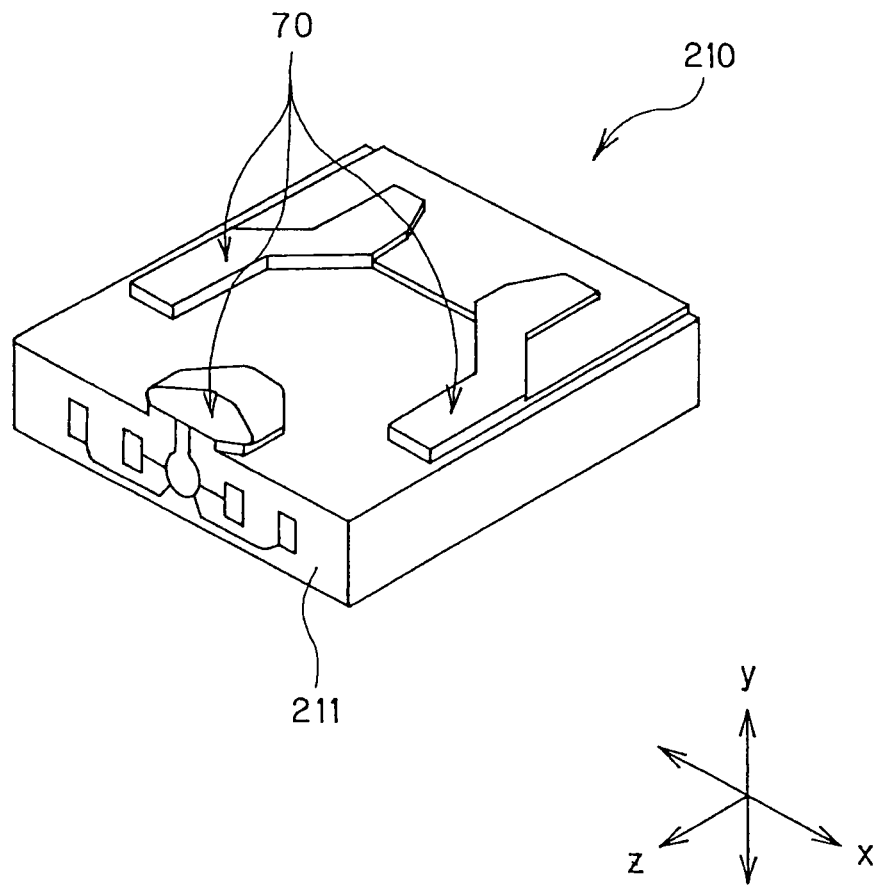
FIG. 8 is illustrative in perspective of the slider included in the head gimbal assembly according to one embodiment of the invention.

As the hard disk rotates in the z-direction in FIG. 8, it causes an air flow passing between the hard disk and the slider 210 to induce lift relative to the slider 210 in the downward y-direction in FIG. 8. This lift in turn causes the slider 210 to levitate over the surface of the hard disk. Note here that the x direction in FIG. 8 traverses tracks on the hard disk.

Near the end of the slider 210 on an air exit side (the left lower end in FIG. 8), there is the thin-film magnetic head formed according to the embodiment here.

A head gimbal assembly 220 according to this embodiment is now explained with reference to FIG. 9. The head gimbal assembly 220 comprises a slider 210 and a suspension 221 adapted to resiliently support that slider 210. The suspension 221 comprises a leaf spring-form load beam 222 made of typically stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction x of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

Figure 9:
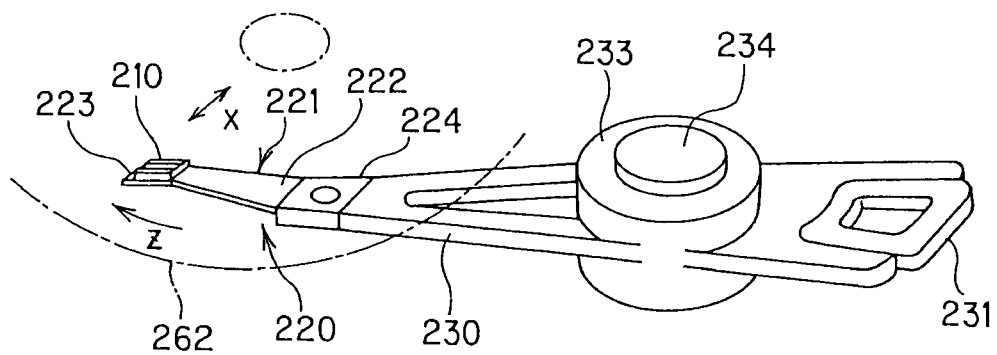
FIG. 9 is illustrative in perspective of the head arm assembly comprising the head gimbal assembly according to one embodiment of the invention.

FIG. 9 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is a bearing portion 233 attached to a shaft 234 adapted to support the arm 230 in a pivotal fashion.

One each example of the head stack assembly and the hard disk system according to the embodiment here are now explained with reference to FIGS. 10 and 11.

Figure 10:
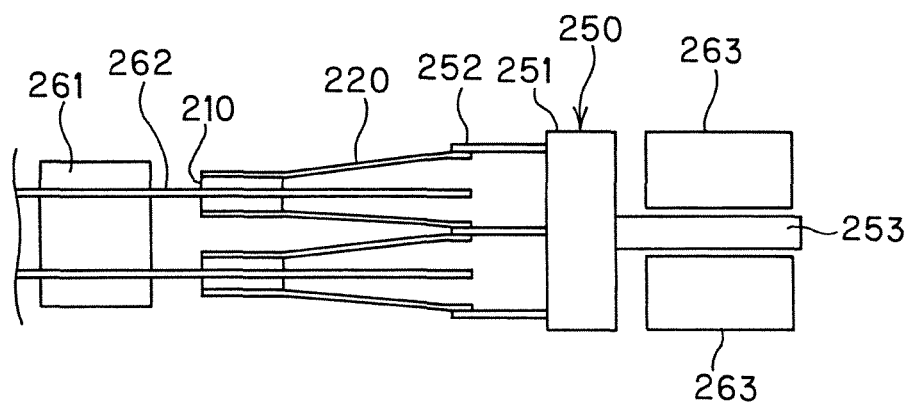
FIG. 10 is illustrative of part of the hard disk system according to one embodiment of the invention.
Figure 11:
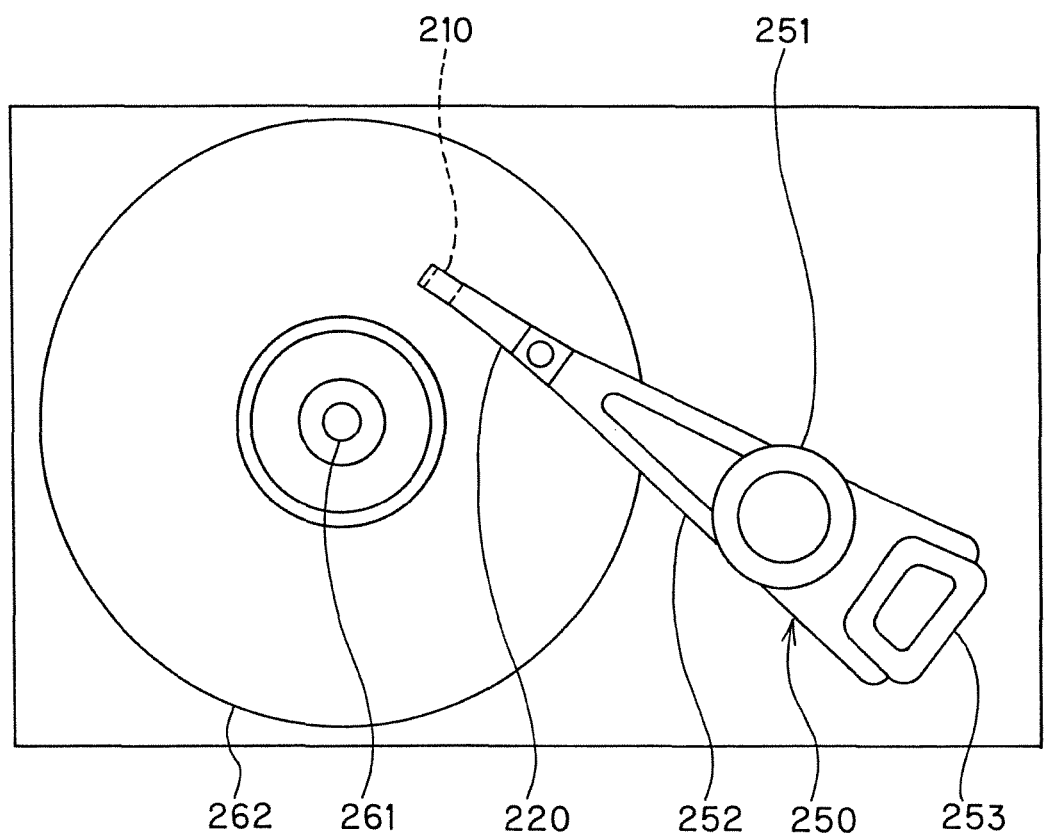
FIG. 11 is a plan view of the hard disk system according to one embodiment of the invention.

FIG. 10 is illustrative of part of the hard disk system, and FIG. 11 is a plan view of the hard disk system.

A head stack assembly 250 comprises a carriage 251 having a plurality of arms 252. The plurality of arms 252 are provided with a plurality of the head gimbal assemblies 220 such that they line up perpendicularly at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device here which is operable to support the slider 210 and position it relative to the hard disk 262.

With the hard disk system here, the actuator is actuated to move the slider 210 in the track traverse direction of the hard disk 262, thereby positioning the slider 210 with respect to the hard disk 262. The thin-film magnetic head incorporated in the slider 210 works such that information is recorded by a recording head in the hard disk 262, and the information recorded in the hard disk 262 is played back by a reproducing head.

The head gimbal assembly and the magnetic disk system here have pretty much the same action as the thin-film magnetic head according to the foregoing embodiment.

While the embodiment here has been described with reference to the thin-film magnetic head of the structure wherein the reproducing head is located on the substrate side and the perpendicular recording head is stacked on the reproducing head, it is contemplated that that order of stacking could be reversed. When the thin-film magnetic head here is used as a read-only head, the recording head could be removed from it.

SPECIFIC EXPERIMENTS

The magneto-resistive effect device of the invention is now explained in further details with reference to some specific experiments.

Experimental Example 1

A magneto-resistive effect device having such structure as shown in FIGS. 1, 2 and 3 was prepared to make certain whether practicable magneto-resistive changes were obtained upon detection of signal magnetic fields. The arrangement of part of the multilayer film of a specific device is set out in Table 1 given below as well as in the following additional remark.

Figure 12:
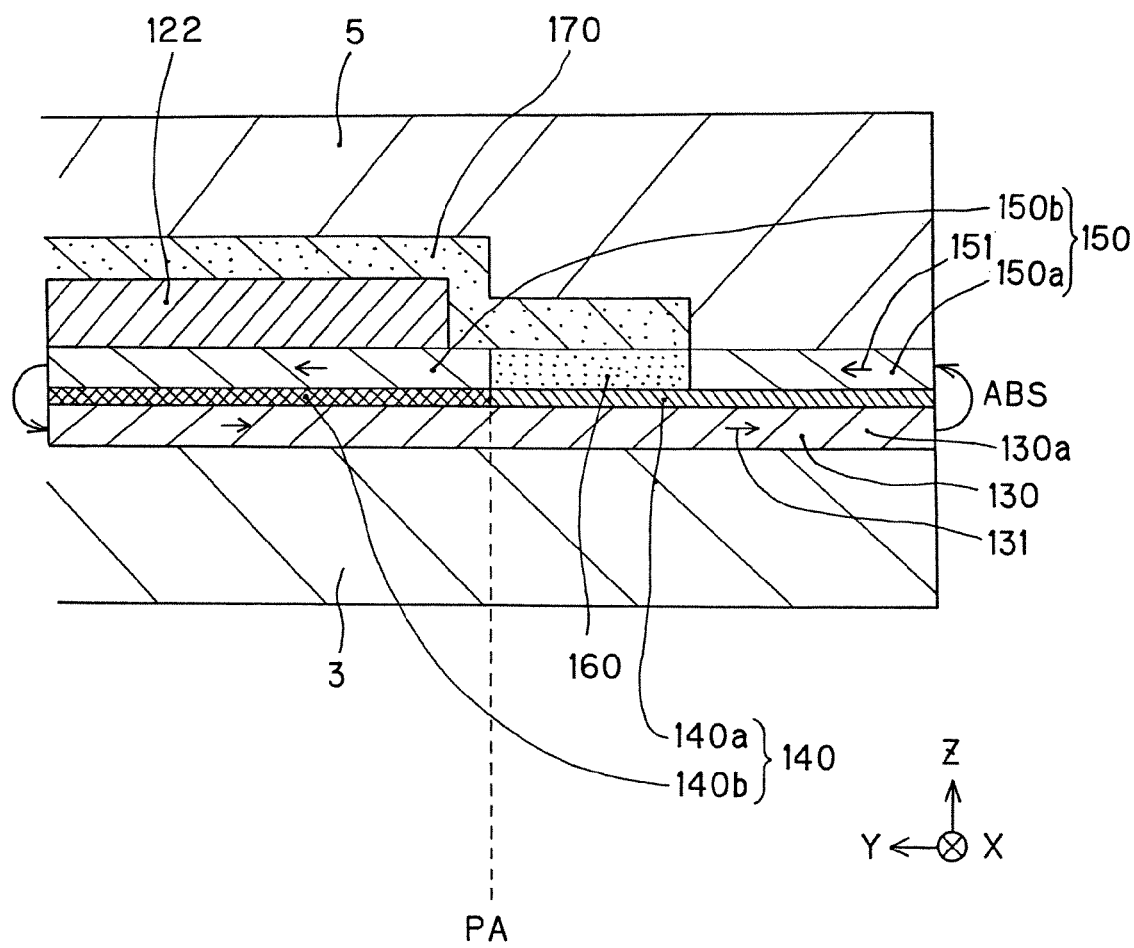
FIG. 12 is illustrative, as in FIG. 2, of the third modification.

Further, there was a magneto-resistive effect device sample having a structure corresponding to Modification (3) explained with reference to FIG. 12 prepared to make certain whether practicable magneto-resistive changes were obtained upon detection of signal magnetic fields. In the sample structure shown in FIG. 12, the front surface portion 140*a* (on the ABS side) of the nonmagnetic intermediate layer 140 was made of MgO (1 nm in thickness), and the rear portion 140*b* of the nonmagnetic intermediate layer 140 was made of Ru (0.8 nm in thickness). The boundary between the front surface portion 140*a* and the rear portion 140*b* was located near the same line position as the rear end position PA of the nonmagnetic intervening layer 160 as shown in FIG. 12. The construction of part of the multilayer film of the specific device is set out in Table 2 given below as well as in the following remark.

TABLE 1

| Multilayer Structure | | Layer Material | Thickness (nm) |
|---|---|---|---|
| Upper Shield Layer (5) | | NiFe | 100 |
| Nonmagnetic Insulating Layer (170) | | $Al_2O_3$ | 20 |
| Antiferromagnetic Layer (122) | | IrMn | 7 |
| Magneto-Resistive Effect Device | Second Ferromagnetic Layer (150) | CoFe | 5 |
| | Nonmagnetic Intermediate Layer (140) | Cu | 1 |
| | First Ferromagnetic Layer (130) | CoFe | 5 |
| Lower Shield Layer (3) | | NiFe | 100 |

(Additional Remark)
Nonmagnetic intervening layer 160 was made of $Al_2O_3$ with an LG length of 10 nm; bias magnetic field-applying layer 106 was made of CoPt; insulating layer 104 was made of $Al_2O_3$; and the sensor portion had a LY length of 8 nm.

TABLE 2

(Device Structure of FIG. 12)

| Multilayer Structure | | Layer Material | Thickness (nm) |
|---|---|---|---|
| Upper Shield Layer (5) | | NiFe | 100 |
| Nonmagnetic Insulating Layer (170) | | $Al_2O_3$ | 20 |
| Anti ferromagnetic Layer (122) | | IrMn | 7 |
| Magneto-Resistive Effect Device | Second Ferromagnetic Layer (150) | CoFe | 5 |
| | Nonmagnetic Intermediate Layer (140) | Front Surface Portion (140a) | MgO | 1 |
| | | Rear Portion (140b) | Ru | 0.8 |
| | First Ferromagnetic Layer (130) | CoFe | 5 |
| Lower Shield Layer (3) | | NiFe | 100 |

(Additional Remark)
The nonmagnetic intervening layer 160 was made of $Al_2O_3$ with an LG length of 10 nm; the bias magnetic field-applying layer 106 was made of CoPt; the insulating layer 104 was made of $Al_2O_3$; and the sensor portion had a LY length of 8 nm.

The thus formed two types of magneto-resistive effect device samples were used to detect signal magnetic fields from a medium corresponding to −400 Oe to 400 Oe. As a result, it was ascertained that practicable magneto-resistive changes could be obtained.

From the aforesaid results, the advantages of the invention would be undisputed. That is, the present invention provides a magneto-resistive effect device of the CPP structure comprising a nonmagnetic intermediate layer, and a first ferromagnetic layer and a second ferromagnetic layer stacked together and formed with the nonmagnetic intermediate layer sandwiched between them, wherein the first ferromagnetic layer and the second ferromagnetic layer are magnetically coupled via the nonmagnetic intermediate layer such that the magnetizations of the first ferromagnetic layer and the second ferromagnetic layer are antiparallel with each other wherein the mutually antiparallel magnetizations of two magnetic layers lie in a medium opposite plane or front to rear direction and in a rear to front direction, the second ferromagnetic layer is divided by a nonmagnetic intervening layer into a front second ferromagnetic layer and a rear second ferromagnetic layer on the way from the front to the rear, and the front second ferromagnetic layer and a front portion of the first ferromagnetic layer located at a position that makes a pair with the front second ferromagnetic layer via the nonmagnetic intermediate layer defines a substantial magnetic sensor portion with a sense current applied to said magnetic sensor portion in a stacking direction. It is thus possible not only to make use of a structure capable of narrowing the read gap (between the upper and the lower shield) to make improvements in linear recording densities thereby meeting recent demands for ultra-high density recording, but also to get around a problem of unneeded information being written on the medium (media) and make the device less likely to be affected by the magnetic field, thereby enhancing the stability of operation of the device itself as well.

INDUSTRIAL APPLICABILITY

The present invention could be applied to the industry of magnetic disk systems comprising a magneto-resistive effect device operable to read the magnetic field intensity of magnetic recording media or the like as signals.

What we claim is:

1. A magneto-resistive effect device of a CPP structure, comprising a nonmagnetic intermediate layer, and a first ferromagnetic layer and a second ferromagnetic layer stacked together and formed with the nonmagnetic intermediate layer sandwiched between them, wherein:

said first ferromagnetic layer and said second ferromagnetic layer are magnetically coupled via the nonmagnetic intermediate layer such that magnetizations of said first ferromagnetic layer and said second ferromagnetic layer are antiparallel with each other wherein mutually antiparallel magnetizations of two magnetic layers lie in a medium opposite plane or front to rear direction and in a rear to front direction, said second ferromagnetic layer is divided by a nonmagnetic intervening layer into a front second ferromagnetic layer and a rear second ferromagnetic layer on the way from the front to the rear, and said front second ferromagnetic layer and a front portion of said first ferromagnetic layer located at a position that makes a pair with said front second ferromagnetic layer via said nonmagnetic intermediate layer defines a substantial magnetic sensor portion with a sense current applied to said magnetic sensor portion in a stacking direction.

2. The magneto-resistive effect device of the CPP structure according to claim 1, wherein said front second ferromagnetic layer at said magnetic sensor portion is more likely to be affected by an external magnetic field and larger in a degree of movement of magnetization direction than the front portion of said first ferromagnetic layer.

3. The magneto-resistive effect device of the CPP structure according to claim 1, wherein to and at a rear position of either one of said first ferromagnetic layer and said second ferromagnetic layer there is an anti-ferromagnetic layer connected and formed to bring about magnetic coupling between said first ferromagnetic layer and said second ferromagnetic layer.

4. The magneto-resistive effect device of the CPP structure according to claim 1, wherein at each end of said magnetic sensor portion in a widthwise direction, there is a bias magnetic field-applying layer located.

5. The magneto-resistive effect device of the CPP structure according to claim 1, wherein said nonmagnetic intermediate layer has varying thicknesses at a front surface portion and a rear portion.

6. The magneto-resistive effect device of the CPP structure according to claim 1, wherein a front surface portion of said nonmagnetic intermediate layer is made of a material of weaker coupling and a rear portion of said nonmagnetic intermediate layer is made of a material of stronger coupling.

7. A thin-film magnetic head, characterized by comprising:
a plane in opposition to a recording medium, and
a magneto-resistive effect device as recited in claim 1, that is located near said medium opposite plane to detect a signal magnetic field from said recording medium.

8. A head gimbal assembly, characterized by comprising:
a slider including a thin-film magnetic head as recited in claim 7 and located in opposition to the recording medium, and
a suspension adapted to resiliently support said slider.

9. A hard disk system, characterized by comprising:
a slider including a thin-film magnetic head as recited in claim 7 and located in such a way as to oppose to said recording medium, and
a positioning device adapted to support and position said slider with respect to said recording medium.

* * * * *